Aug. 7, 1956

F. P. GOHOREL

TELEPHONE SYSTEMS 2,758,157

Filed Dec. 4, 1952

3 Sheets-Sheet 1

Inventor
FERNAND P. GOHOREL

By Robert Harding Jr.
Attorney

Aug. 7, 1956 F. P. GOHOREL 2,758,157

TELEPHONE SYSTEMS

Filed Dec. 4, 1952 3 Sheets-Sheet 2

Inventor
FERNAND P. GOHOREL

By Robert Harding Jr.
Attorney

Aug. 7, 1956

F. P. GOHOREL 2,758,157

TELEPHONE SYSTEMS

Filed Dec. 4, 1952

3 Sheets-Sheet 3

Inventor
FERNAND P. GOHOREL

By Robert Harding Jr.
Attorney

United States Patent Office 2,758,157

Patented Aug. 7, 1956

2,758,157

TELEPHONE SYSTEMS

Fernand Pierre Gohorel, Antony, France, assignor to International Standard Electric Corporation, New York, N. Y., a corporation of Delaware Application December 4, 1952, Serial No. 323,991

Claims priority, application France January 16, 1952

4 Claims. (Cl. 179—22)

This invention relates to automatic telephone systems in which a common or directing member is used to direct the selectors in each hunting or selecting stage.

During the establishing of a call in these stages, various temporary connections must be made in order to direct the selectors, such as connections between the inlet to the selector and director and between the outlets of the selector and the director. These connections can be made by means of relays or finders. In the case of selectors of the crossbar type, certain arrangements which are covered by this invention, make it possible to reduce the size of the connecting members.

A crossbar switch consists of juxtaposed selectors: each selector comprises contacts (equal in number to that of the outlets) all connected to the inlet of the selector and capable, when closed, of connecting said inlet to one of the outlets. The crossbar switch has selection magnets the number of which depends on the number of outlets. By their temporary action these magnets can prepare the closing of a given contact in any of the selectors. Each selector also has a magnet capable of causing and of maintaining the connection.

Normally the corresponding outlets of the individual selectors are multipled together. In accordance with the invention one of the individual selectors of the switch has its outlets independent of the corresponding outlets of the other individual selectors, and this particular individual selector is used as a member for temporarily connecting a seized individual selector to the director.

One of the features of the invention consists in the use of a member similar to the selectors, placed adjacent to them and capable of temporarily connecting the inlets of the selector to the director, the latter being connected to the inlet of said member and the inlets of said selector being connected to the outlets of said member.

Another feature of the invention is based on a member similar to the selectors and placed adjacent to them, said member being capable of the temporarily connecting one or more circuits associated with the outlets of the selector to the director, said director being connected to the inlet of said member and the outlets of the selector being connected to the outlets of said member.

In certain systems, an idle selector cannot be seized by the preceding selector when the corresponding director is busy. Because of this, this selector cannot be used to route a call. It may be advantageous to provide arrangements that obviate this difficulty.

Another feature of the invention is based on the fact that if a selector is idle and if the corresponding director is busy, the selector can be seized but the call remains recorded on a device common to all the selectors served by the same director until the director is idled, at which time said device causes the seizing of said director and its connection to said selector.

Various other features will become apparent from the following description, given as a non-limitative example, with reference to the attached figures, in which.

In the following description, the relay contacts that are closed when the relay with which they are associated is energized, that is, when it is in the pulled-up position, are denoted by prefixing the letter T to the spring number; and the contacts that are closed when the relay is not energized, that is, when it is in the unoperated position, are denoted by prefixing the letter R to the spring number. In addition, the contact springs associated with a given relay are denoted by affixing one of the numbers from 1 to 9 to the relay reference.

It will be assumed, in all that follows, that the switch used as a selector is a crossbar switch. Each bar is associated with a selection magnet and assumes an active position when this magnet is energized. In that position, said bar prepares the connection of a line to a connecting bar.

The selection magnets merely prepare the connection of an individual switch to a line, said connection being caused by an operating magnet peculiar to each individual switch. The connection is held as long as the operating magnet is energized.

The method of connecting a crossbar type selector P to a director OC will now be described with reference to Fig. 1. The whole arrangement comprises a selector P with its inlet wires *a, b, c, t*; its outlet wires *a', b', c', t'*, its magnets S1, S2, S3 . . . and its connecting magnet VP. Inlet wires *a, b, c, t*, of P are connected to outlet wires *a*1, *b*1, *c*1, *t*1 of a particular individual selector X whose outlets are independent from the corresponding outlets of the other selectors.

This selector X, which is mounted on the same frame as selector P, provides connection for a sufficient length of time between the inlet of selector P and director OC to permit the positioning of said selector P. Inlet wires *a*2, *b*2, *c*2, *t*2 and *v*2 of selector X are connected to director OC. The reference XP has been used to denote the connecting magnet of selector X. Selection magnets S1 and S2 are used by the two selectors X and P.

Figure 1:
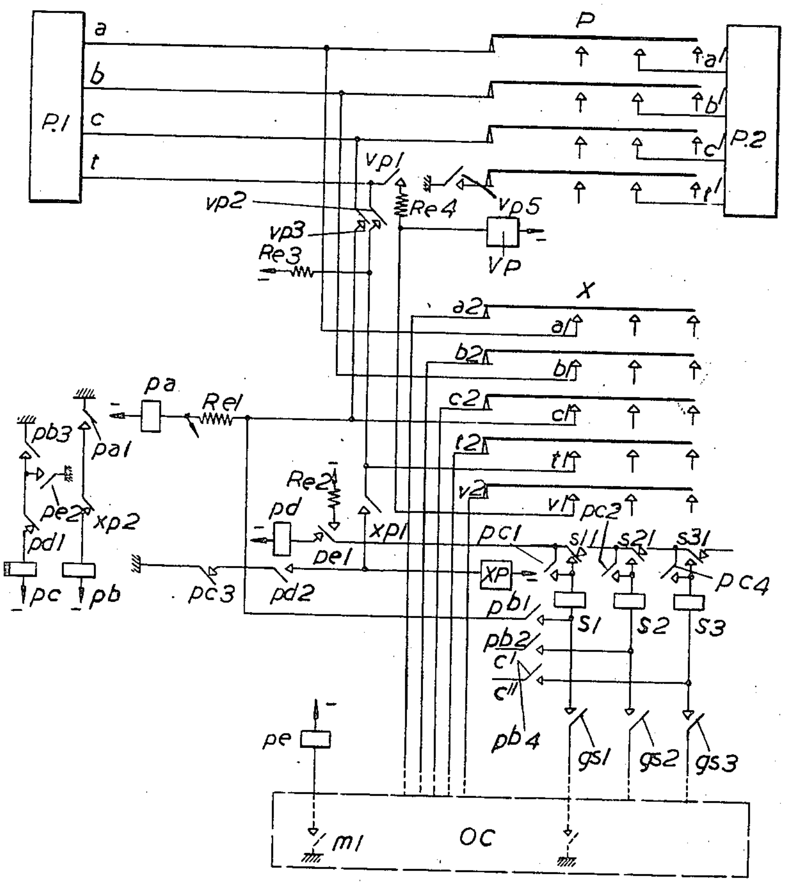
Fig. 1 shows the parts necessary for an understanding of one form of the invention to be a selector, a director, and the individual selector which acts as a connecting device between the seized selector inlet and said director.

Normally, the various relays and magnets shown in Fig. 1 are in the unoperated position. The availability of selector P is marked by battery on wire *t* over the following circuit: wire *t*, R *vp*2, resistance R*e*3, battery. When selector P is seized by the preceding selector P1, ground is applied to wire *c*, thus completing the following energizing circuit for relay *pa*: ground on wire *c*, R *vp*3, resistance R*e*1, relay *pa*, battery. This relay *pa*, which is common to all the *c* wires of the selectors capable of being associated with the same director OC, is energized.

Through its contact *pa*1, it completes the circuit of relay *pb*, which energizes: ground, T *pa*1, R *xy*2, relay *pb*, battery.

Through its front contacts *pb*1, *pb*2 and *pb*4, relay *pb* prepares the possible energizing circuits of magnets S1, S2 and S3. Through its front contact *pb*3 it completes the following circuit: ground, T *pb*3, R *pd*1, relay *pc*, battery. Relay *pc* energizes.

Through its front contact *pc*1, relay *pc* completes the energizing circuit of magnet S1 through relay *pd*. Relay pd and magnet S1 energize in series: ground on wire c, R vp3, T pb1, magnet S1, T pc1, R pe1, relay pd, battery.

Through its contact pd1, relay pd opens the energizing circuit of relay pc, which, being a slow-acting relay, releases after a certain delay, thus making it possible for contact s11, associated with magnet S1, to close its contact sufficiently before contact pc1 opens and breaks the energizing circuit of magnet S1 and of relay pd. At its contact pd2, relay pd completes the energizing circuit of magnet XP after the release of relay pc: ground, R pc3, T pd2, magnet XP, battery.

Energized magnet S1 prepares the connection of selector X to the inlet wires a, b, c, t, of the calling selector P; at its front contacts s11, it completes a holding circuit for itself. At its back contact s11, it opens the possible energizing circuits of the other magnets S2 and S3, thus preventing the simultaneous operation of several of said magnets.

On operating, magnet XP connects selector X to outlets a1, b1, c1, t1 of said selector and, therefore, to inlet wires a, b, c, t of calling selector P.

At its front contact xp1, magnet XP completes a holding circuit for itself: battery, magnet XP, T xp1, R vp2, ground on wire t. At its back contact xp2, it opens the circuit of relay pb, which releases.

At its front contact pb1, relay pb opens the energizing circuit of magnet S1 and of relay pd, both of which release.

Thus, through the operation of magnet XP, the inlet wires a, b, c, t of calling selector P are connected to to director OC through wires a1, b1, c1, t1, a2, b2, c2, t2.

Ground is applied to director OC over the following circuit: wire c of selector P, R vp3, wires c1 and c2 of selector X, director OC, thus causing the seizure of the director. Said director then closes contact m1 and relay pe is energized.

At its back contact pe1, it isolates relay pd and prepares, at its front contact pe1, an energizing circuit for one of the magnets S. At its front contact pe2 it completes the following energizing circuit for relay pc: ground, T pe2, R pd1, relay pc, which energizes, battery.

Director OC receives over wires a2 and b2 the number of the line or group of lines and causes the operation of a given magnet S, which characterizes said line or an idle line of said group. It may be assumed, for example, that the line selected by the director corresponds to magnet S2, the following circuit being then completed: contact gs2 grounded by the director, magnet S2, T pc2, R s11, T pe1, resistance Re2, battery.

Magnet S2 energizes and selects the line leaving the selector P, since the magnets S1, S2, S3 are the select magnets of both P and X. The director then applies ground to wire v2. The following circuit is then completed: ground on the director, wire v2, wire v1 of selector X, magnet VP, battery. Magnet VP energizes.

On operating, magnet VP connects the inlet wires a, b, c, t of selector P to outlet wires a', b', c', t'.

At its contact vp1, it completes a holding circuit for itself: battery, magnet VP, resistance Re4, T vp1, wire t, ground. At its back contact vp2 it opens the holding circuit of magnet XP, which releases. At its contact vp3 it opens the circuit of relay pa, which also releases. At its front contact vp5 it grounds wire t of selector P in order to mark a busy condition on the chosen line a', b', c', t', terminating at the following selector P2.

On releasing, magnet XP breaks the connection between the inlet of selector P and director OC, which releases.

On releasing, the director opens the circuit of relay pe, which releases. It also removes ground from wire v2, but magnet VP, as already indicated, holds through its contact vp1. Through gs2 ground is removed from the energizing circuit of S2, which in turn releases.

Upon releasing, relay pe opens the energizing circuit of relay pc, which releases.

Magnet VP alone remains seized, in order to hold selector P.

The case in which several simultaneous calls are received will now be considered. If two selectors P are both calling selectors at the same time, preference is given to the first selector controlled by magnet S1. The second selector has to wait until the first call has been routed for its magnet to be operated.

A variant of the device shown in Fig. 1 will now be described with reference to Fig. 2. This variant is intended especially for the case where the group of selectors P associated with the common director OC cannot receive additional calls as long as one of said selectors is associated with said control member.

Availability is marked by the application of battery in the director to wire t through contact R xp3 and contact R vp3, indicating to the preceding selector P1 that associated selector P and director OC are available. When selector P1 finds an idle selector P, associated with director OC, it seizes it and applies battery to wire a through back contact em and ground to wire t; the following circuit is then completed: battery on wire a, R vp2, left-hand winding of magnet S1, R xp4, R xp5, ground. Magnet S1 energizes and prepares the connection of selector X to calling selector P.

At its contacts s11, magnet S1 completes the energizing circuit of magnet XP; ground on wire t applied by selector P1, R vp3, T s11, magnet XP, battery.

Magnet XP energizes, and through its front contact xp3, completes the following holding circuit for itself: ground, wire t, R vp3, T xp3, resistance Re6, magnet XP, battery. At its contacts xp4 and xp5, it opens the circuit of magnet S1, which releases.

Because of the energization of magnet XP, the inlet wires a, b of selector P are thus connected to director OC through wires a1, b1 of selector X and wires a2, b2.

The selection control signals are transmitted over wires a and b to director OC. Said director then causes the operation of a given magnet S, which characterizes the selected line. Thus, for example, if the selected line is line a', b', t', magnet S3 is energized over the following circuit: battery, right-hand winding of magnet S3, T gs3, and ground in director OC.

The director then applies ground to wire v2, which completes the energizing circuit of magnet VP: ground on OC, wire v2, wire v1, magnet VP, battery. Magnet VP energizes.

When magnet VP operates, it connects wires a, b, t of selector P to the outlet wires a', b', t' of the selected line. When it opens its back contacts vp2 and vp3 it disconnects selector P from selector X and from director OC. Because of this, magnet XP releases; selector X and the director release.

Through its front contact vp1 it completes a holding circuit: ground applied to wire t by selector P1, T vp1, resistance Re5, magnet VP, battery. Through its front contact vp5 it grounds the t wire of the chosen selector P in order to mark a busy condition on the selected line a', b', t'.

As has been indicated, selector P cannot be seized unless director OC is available. Consequently, as soon as a selector P is seized, none of the other selectors P controlled by the same director can be seized; selector X cannot therefore receive two calls simultaneously and no arrangement is necessary to prevent the simultaneous operation of two S magnets.

When selector P is available, back contact vp4 is closed, and when selector X is also available, wire ch1 is grounded; therefore, the wire ch peculiar to selector P is grounded. Wires ch of all the selectors belonging to the same group are multiplied on the same wire f1. If there is at least one selector of this group that is available and associated with an available X selector, wire f1 is grounded. On the other hand, if there is no selector in the group that meets these two conditions simultaneously wire $f1$ is isolated. This arrangement makes it possible for selectors located up above to determine whether there is at least one idle line in the group.

Figure 3:
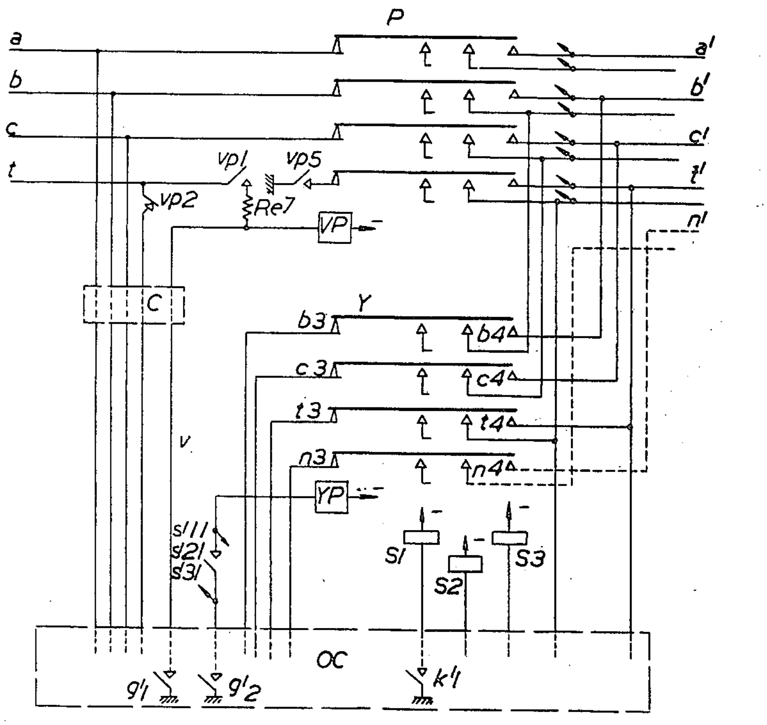
Fig. 3 shows the parts necessary for an understanding of another form of the invention to be a selector, a director, and the individual selector which acts as a connecting device between the outlet of the seized selector and said director.

In the preceding description, it was assumed that the director could perform its functions by simply being connected to the inlet wires of selector P. It may be necessary in certain cases also to connect the director to all or part of the wires of the selected line. Fig. 3 shows a device whereby it is possible to connect the director to all or part of the selected line.

Selector Y is controlled by selection magnets S'; its outlets are connected to the outlets of selector P; its inlets are connected to director OC.

Figure 2:
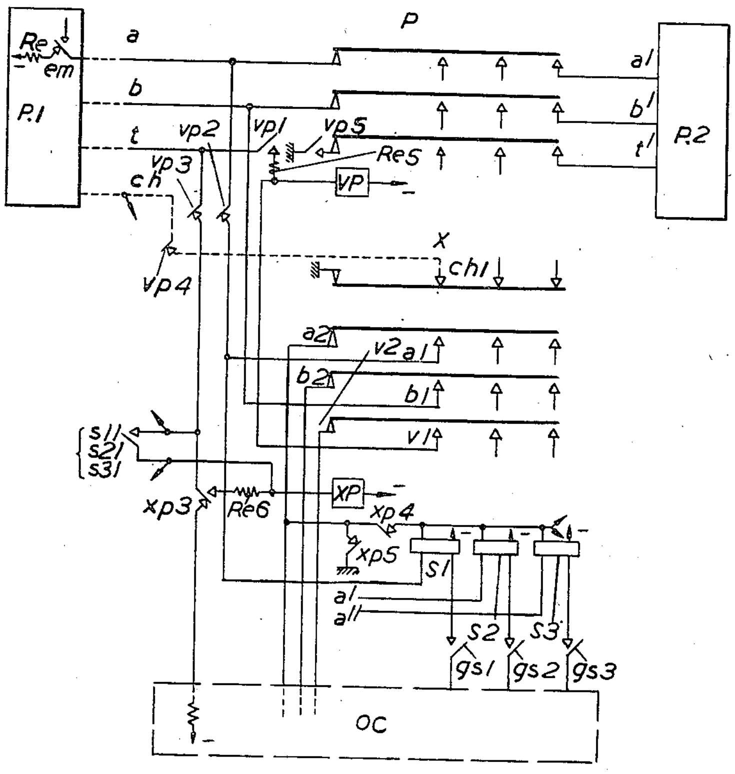
Fig. 2 is a variant of the device of Fig. 1 for the case in which the group of selectors associated with the same director cannot receive any further calls as long as one of said selectors is associated with said director.

It will be assumed that the inlet wires *a, b, c, t* of selector P are connected to director OC through a device C, which may be that shown in Fig. 1 or 2.

Director OC receives the selection control signals over wires *a* and *b* and in accordance therewith applies ground to one of the S' selection magnets, S'1, for example, which energizes.

Through its contact *s'*11 (contacts *s'*21 and *s'*31 are connected in parallel with the former), it completes an energizing circuit for magnet YP. This magnet energizes. When the selection or control operation is ended, director OC grounds wire *v* through contact *g'*1, and through connector C, energizes magnet VP. This magnet VP is energized.

When magnet VP operates, it connects the inlet wires *a, b, c, t* of selector P to wires *a', b', c', t'* of the selected line.

Through its contact *vp*1 it establishes a holding circuit: ground on wire *t*, T *vp*1, resistance *Re*7, magnet VP, battery. Through its contact *vp*2, it disconnects wire *t* of connector C, causing the release of connector C and of director OC. Through its front contact *vp*5, it grounds selector P for the reasons already set forth. The ground that director OC had applied to magnets S'1 and YP is removed; these magnets release. Selector Y is released.

What I desire to claim and secure by Letters Patent is:

1. A selection system comprising a multi-switch having a plurality of individual selectors, each having an inlet and a plurality of outlets, one of said individual selectors having its outlets connected respectively to the inlets of the other individual selectors, a director connected to the inlet of said one individual selector, means for seizing one of said other individual selectors, means controlled by the seizure of said other selector for causing said one individual selector to connect its inlet with the outlet connected to the seized selector, whereby the seized selector is connected to said director, means controlled by said director for preparing said seized individual selector for connecting with a selected outlet, and means also controlled by said director for completing the connection of said seized individual selector with said selected outlet and for releasing said one inidividual selector to break the connection between said director and the inlet of said seized individual selector.

2. A selection system, according to claim 1, in which the director has an additional circuit and in which a second particular one of the individual selectors has its inlet connected to said additional circuit and certain wires of its outlet connected respectively to corresponding outlets of the others of said individual selectors.

3. A selection system, according to claim 1, in which the means controlled by the seizure of the other selector for causing the one individual selector to connect its inlet with the outlet connected to the seized individual selector comprises magnets for respectively preparing said one individual selector for connection to a selected outlet thereof, and relay means controlled by a signal from a preceding selector for energizing the particular one of said magnets for preparing the connection of the inlet of said one individual selector with that of said seized individual selector and for completing the connection so prepared.

4. A selection system comprising a multi-switch having a plurality of individual selectors, each having an inlet and a plurality of outlets, a director, one of said individual selectors having its inlet connected to said director and its outlets respectively multiplied to corresponding outlets of the other individual selectors, means for seizing one of said other individual selectors, means controlled by the seizure of said other individual selector for connecting said director to the inlet of said seized other individual selector, means controlled by said director for preparing said one individual selector for connection to a selected outlet thereof, means controlled by said director for operating said one individual selector, whereby said director is connected to the selected outlet thereof, and means controlled by said director for subsequently operating said seized other individual selector to connect its inlet to its outlet multiplied to said selected outlet and for disconnecting said director from the inlet of said seized other individual selector and for releasing said one individual selector.

References Cited in the file of this patent

UNITED STATES PATENTS

| | | |
|---|---|---|
| 2,412,258 | Gillings et al. | Dec. 10, 1946 |
| 2,583,848 | Johnson | Jan. 29, 1952 |